(12) United States Patent
Takeuchi et al.

(10) Patent No.: US 6,866,332 B2
(45) Date of Patent: Mar. 15, 2005

(54) OPERATOR'S ROOM FOR WORK MACHINE

(75) Inventors: Yasuhiko Takeuchi, Katano (JP); Naomi Kobayashi, Hirakata (JP); Toshio Ibuki, Kyoutanabe (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/819,266

(22) Filed: Apr. 7, 2004

(65) Prior Publication Data

US 2004/0217630 A1 Nov. 4, 2004

(30) Foreign Application Priority Data

Apr. 10, 2003 (JP) ........................................ 2003-106622

(51) Int. Cl.$^7$ ............................................... B62D 33/06
(52) U.S. Cl. ............................... 296/190.11; 180/89.12; 180/89.18
(58) Field of Search ................ 296/190.11, 190.01, 296/190.08, 202, 97.23, 1.03; 180/89.12, 89.16, 89.17, 89.18, 89.19; 49/501

(56) References Cited

U.S. PATENT DOCUMENTS

| | | | |
|---|---|---|---|
| 3,954,150 A | | 5/1976 | Cole et al. |
| 3,981,375 A | * | 9/1976 | Crawford ................ 180/69.21 |
| 4,440,437 A | | 4/1984 | Hahm et al. |
| 4,785,900 A | * | 11/1988 | Nasky ...................... 180/89.14 |
| 5,301,469 A | * | 4/1994 | Lyons, Sr. ................... 49/386 |
| 5,498,060 A | * | 3/1996 | Satomi .................. 296/190.07 |
| 6,257,645 B1 | * | 7/2001 | Kraimer et al. .......... 296/97.23 |
| 6,371,232 B1 | * | 4/2002 | Drake et al. ............. 180/89.12 |
| 6,550,571 B1 | | 4/2003 | Kimura et al. |
| 6,578,651 B2 | * | 6/2003 | Murase ..................... 180/89.17 |
| 6,695,380 B1 | * | 2/2004 | Hicks ...................... 296/97.23 |
| 6,709,046 B2 | * | 3/2004 | Okazawa et al. ...... 296/190.07 |

FOREIGN PATENT DOCUMENTS

JP 2002-302067 10/2002

* cited by examiner

Primary Examiner—Hilary Gutman
(74) Attorney, Agent, or Firm—Wenderoth, Lind & Ponack, L.L.P.

(57) ABSTRACT

An operator's room (cab) situated in a region above the power train of a work machine which has an opening for maintenance purposes formed passing through a floor frame and a lid member for closing off the opening installed on the floor frame, and which achieves both good quietness characteristics and good workability during servicing. In the operator's cab of the invention, the floor section of the floor frame has a hollow box-type structure, and the lid member has a hollow box-type structure which fits into the opening in the floor section of the floor frame, and furthermore, a sealing member for sealing a gap between the floor section of the floor frame and the lid member is provided.

1 Claim, 20 Drawing Sheets

OPERATOR'S ROOM FOR WORK MACHINE

BACKGROUND OF THE INVENTION

1. Field of the Invention

The present invention relates to an operator's room for a work machine, and more particularly, to an operator's room situated in the region above the power train in a work machine and being provided with an opening for maintenance which passes through the floor section of the floor frame, and having a lid member for closing the opening installed in the floor section of the floor frame.

2. Description of the Related Art

For example, a tractor, bulldozer, or the like, which is one type of a work machine, comprises a power train, consisting of an engine, or the like, mounted on a main frame equipped with an undercarriage, and is also provided with an operator's room (cab) situated above the power train.

The operator's cab is configured in a skeleton structure formed by assembling a cab frame onto the floor frame, and an opening used for servicing the power train positioned underneath is formed passing through the floor section of the floor frame, this opening usually being closed by a plate (lid member) installed on the floor section.

On the other hand, in the operator's cab of the work machine, such as a bulldozer, or the like, the noise to which the operator (driver) sitting in the cab is exposed, in other words, the noise at the operator's position, tends to be high, due to the infiltration of noise propagated from the power train, which is a noise source, and the like.

Therefore, as means for reducing the noise in the operator's cab, technology has been proposed for suppressing the infiltration of noise into the operator's cab, by adopting a dual structure wherein a sound-proofing wall is provided opposing the partitioning wall that forms the operator's cab, thereby demarcating a sound-proofing space between the partitioning wall and the sound-proofing wall.

Here, by adopting technology for demarcating a sound-proofing space by means of a dual-structured wall, as described above, into the floor section of the floor frame of an operator's cab, it is possible to suppress the noise infiltrating into the operator's cab from the power train positioned below the cab, to a significant degree.

On the other hand, an opening for maintenance purposes as described above is provided in the floor section of the floor frame of the operator's cab, and thus it is necessary to increase sound insulating properties by increasing the thickness of the plate (lid member) that closes off the opening, in such a manner that the infiltration of noise via this plate is suppressed.

However, since the opening in the floor section of the floor frame is formed to a large size from the viewpoint of workability when servicing the power train, and since the plate that closes off this opening is also necessarily formed to a large size, then in order to increase sound insulating properties, the thickness of the material used is increased, and hence the plate becomes large in size and heavy in weight.

Accordingly, the operability when the plate is removed from the floor section of the floor frame, and when the plate is installed on the floor section, is poor, and therefore problems are caused in that the workability of the task of servicing the power train is greatly degraded.

In view of the foregoing, it is an object of the present invention to provide an operator's cab for a work machine whereby a good level of quietness can be achieved, in addition to which good workability in servicing can also be achieved.

SUMMARY OF THE INVENTION

The operator's cab of a work machine relating to the present invention is an operator's cab for a work machine, situated in a region above a power train of the work machine, and having an opening for maintenance purposes formed passing through a floor section of a floor frame, a lid member for closing off the opening being installed on the floor section; wherein the floor section of the floor frame has a hollow box-type structure, and the lid member has a hollow box-type structure fitting into the opening in the floor section, a sealing member being provided for sealing a gap between the floor section and the lid member.

According to the composition described above, since the floor section of the floor frame and the lid member which fits into the opening in this floor section are both formed in hollow box-type structures, and since the gap between the floor section and the lid member is sealed by the sealing member, then the infiltration of noise from the power train situated below the floor frame, into the operator's cab, is suppressed as far as possible, and consequently, the level of quietness in the operator's cab can be improved dramatically.

Moreover, according to the composition described above, by adopting a box-type structure for the lid member, it is possible to achieve good noise insulating properties in the lid member, whilst also forming a lid member which is remarkably light in terms of overall weight compared to a plate-type lid member having equivalent noise insulating properties, and therefore the operations of removing the lid member from the floor section of the floor frame, or installing same on the floor section, can be carried out very readily, and hence workability in the servicing of the power train is improved dramatically.

As described above, according to the operator's cab for a work machine relating to the present invention, it is possible to achieve good quietness characteristics whilst at the same time achieving good workability during servicing.

DESCRIPTION OF THE PREFERRED EMBODIMENTS

Below, the present invention is described in detail on the basis of the drawings which illustrate an embodiment.

FIG. 1 to FIG. 21 show one embodiment in which the present invention is applied to an operator's cab of a construction vehicle, being one type of a work machine, and more specifically, the operator's cab of a bulldozer.

Figure 1:
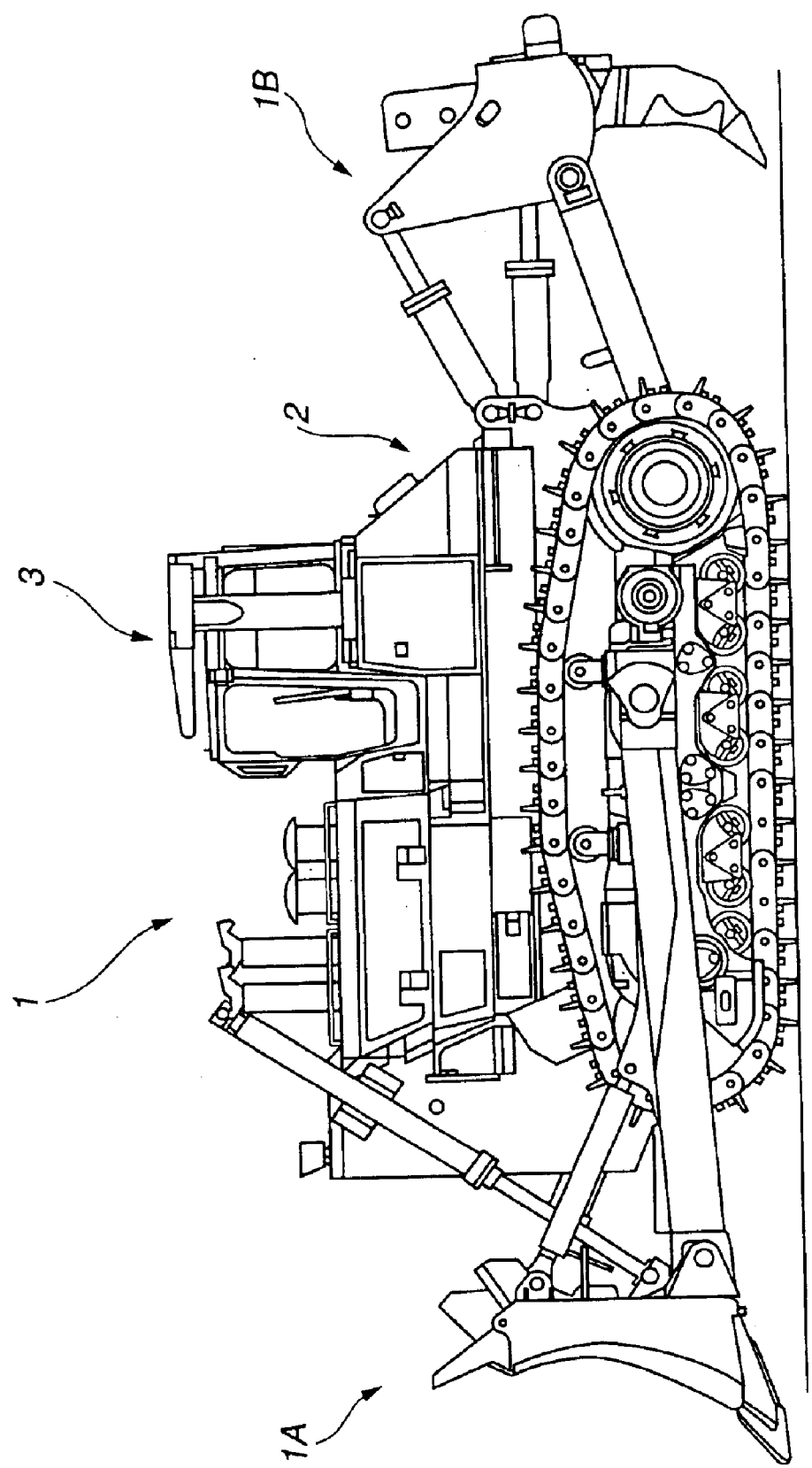
FIG. 1 is a side view of the overall composition of a bulldozer showing one embodiment of a work machine to which the present invention is applied.
Figure 2:
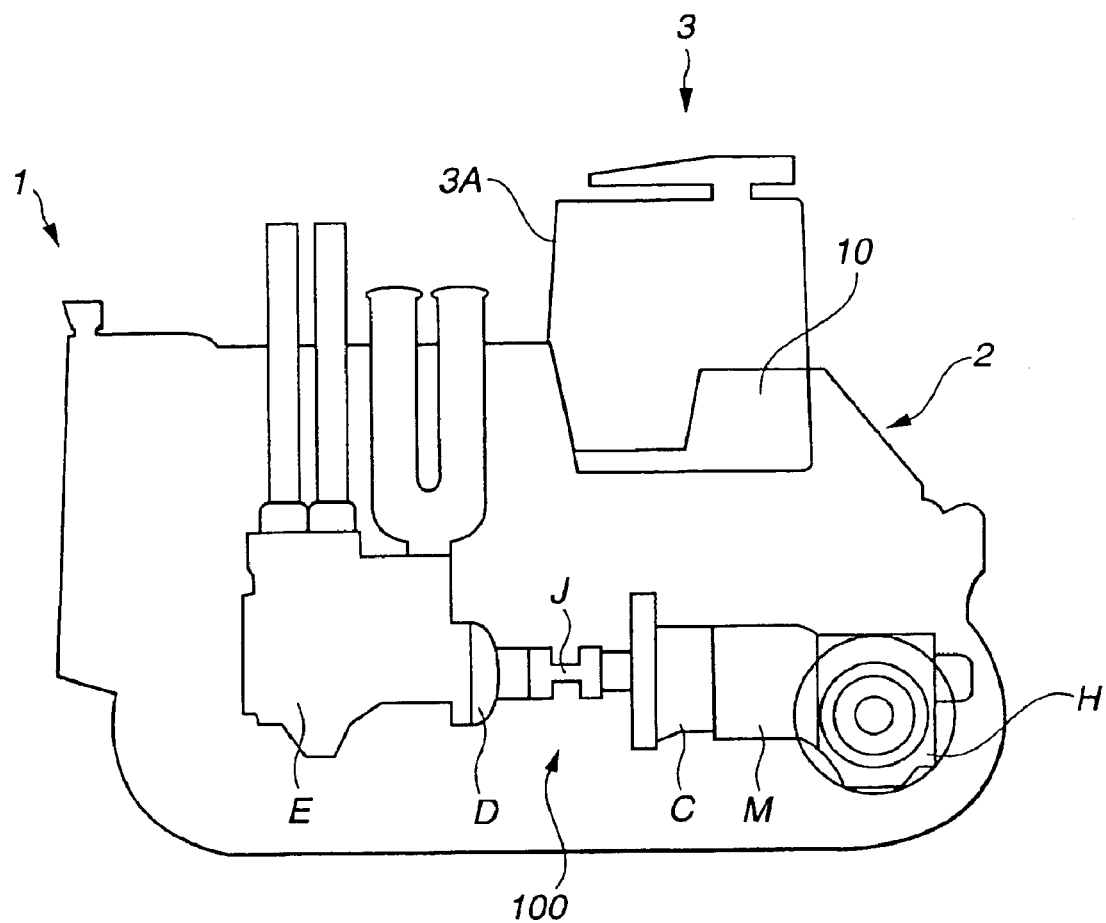
FIG. 2 is a conceptual view showing an operator's cab and a power train in the bulldozer in FIG. 1.

As shown in FIG. 1 and FIG. 2, the bulldozer (work machine) 1 has a front work tool (blade device) 1A and a rear work tool (ripper device) 1B fitted to a tractor 2 which forms the main body of the vehicle, and a power train 100 is mounted on the main frame of the tractor 2 which is equipped with an undercarriage, whilst an operator's cab 3 in which an operator can ride is also installed thereon.

The power train 100 is constituted by an engine E, a damper D, a universal joint J, a torque converter C, a transmission M, and a hydrostatic system unit H, and the like, disposed in this order from the front side (the left-hand side in FIG. 2).

On the other hand, the operator's cab 3 in the bulldozer 1 described above has a skeleton structure formed by assembling a cab frame 3A on a floor frame 10, and it is situated above the power train 100 described above.

Figure 3:
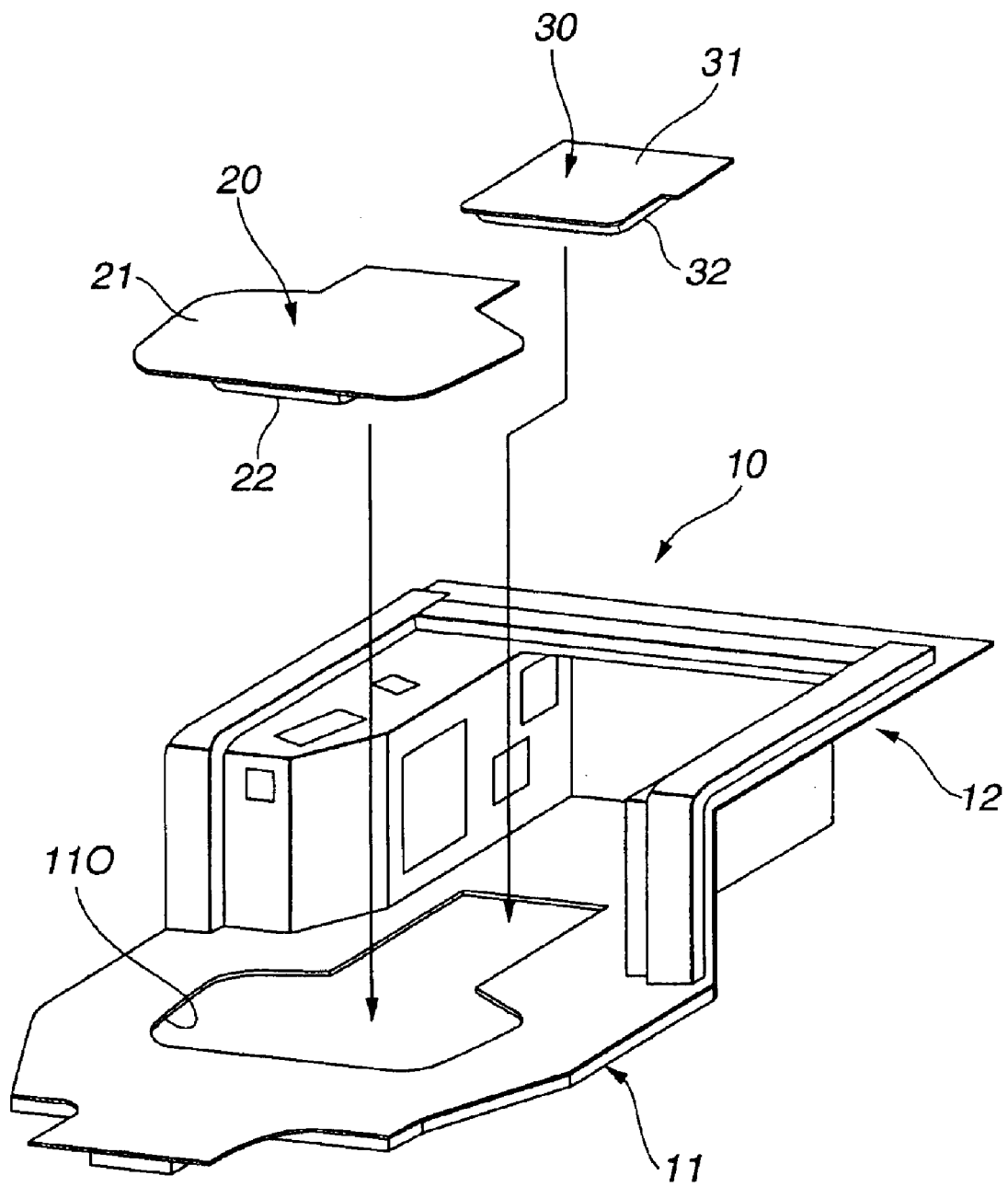
FIG. 3 is an exploded oblique view showing a floor frame and a lid member of the operator's cab in FIG. 1.
Figure 4:
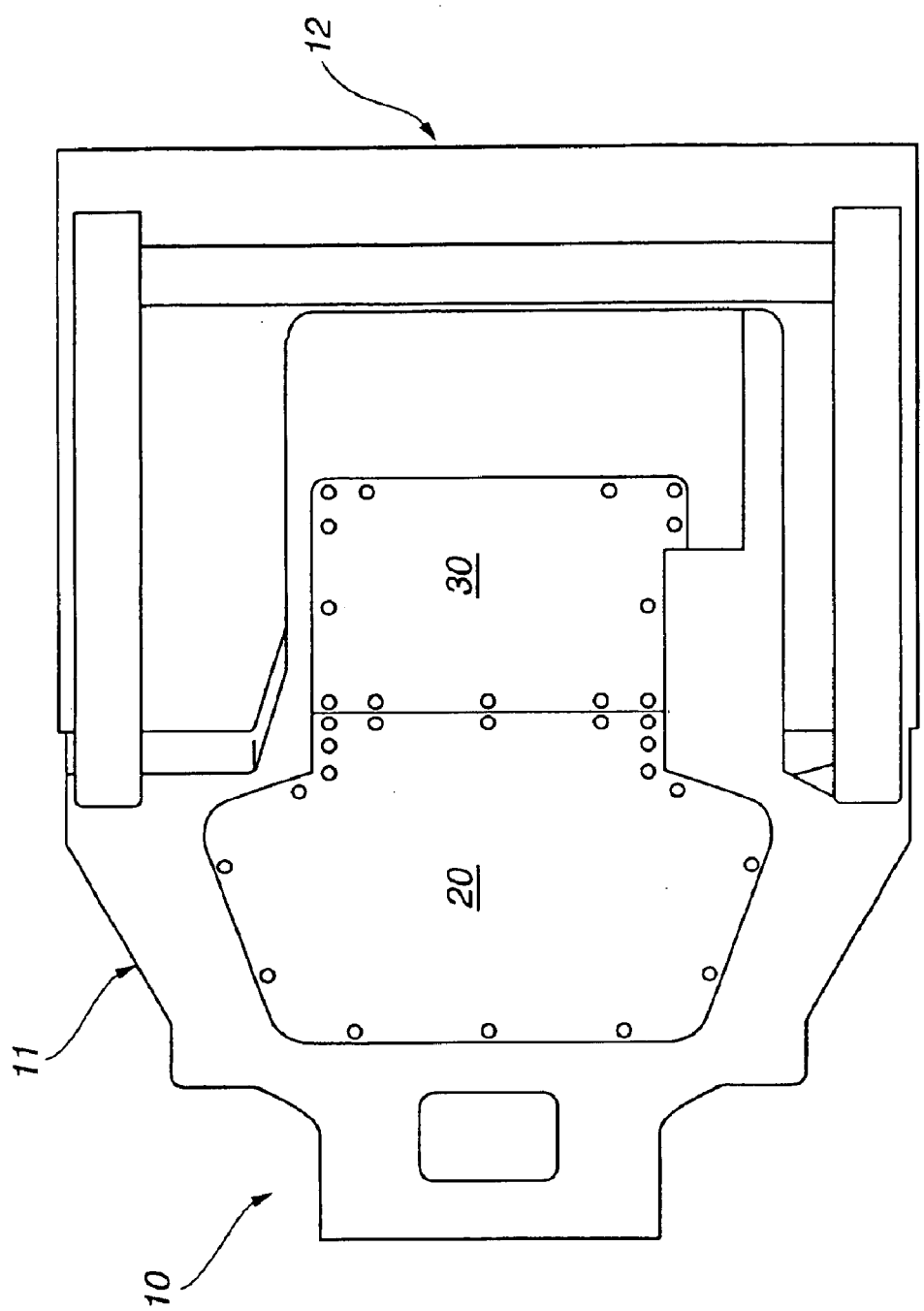
FIG. 4 is a plan view showing a state where the lid member is installed on the floor frame of the operator's cab in FIG. 1.
Figure 5:
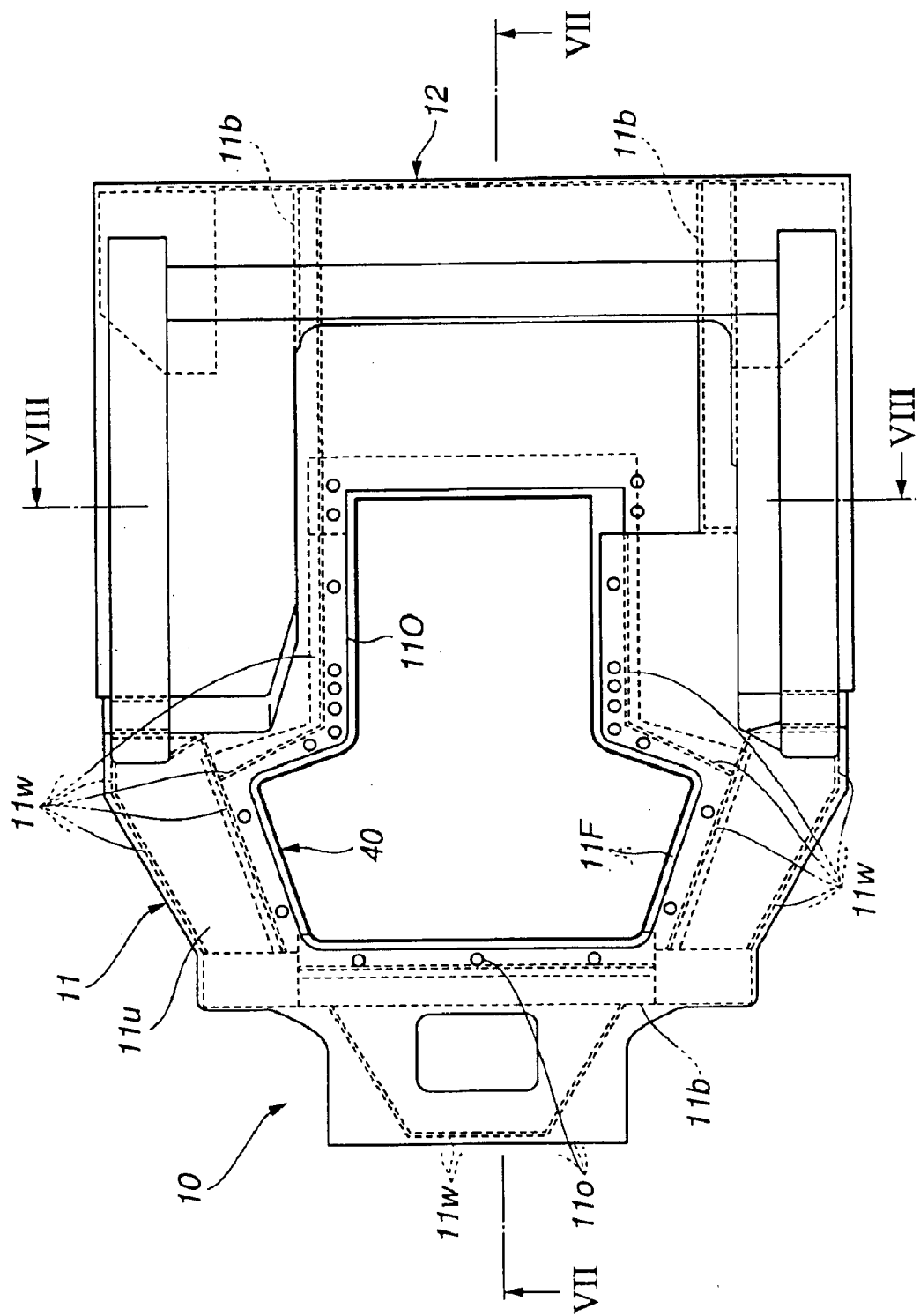
FIG. 5 is a plan view showing a floor frame of the operator's cab in FIG. 1.
Figure 6:
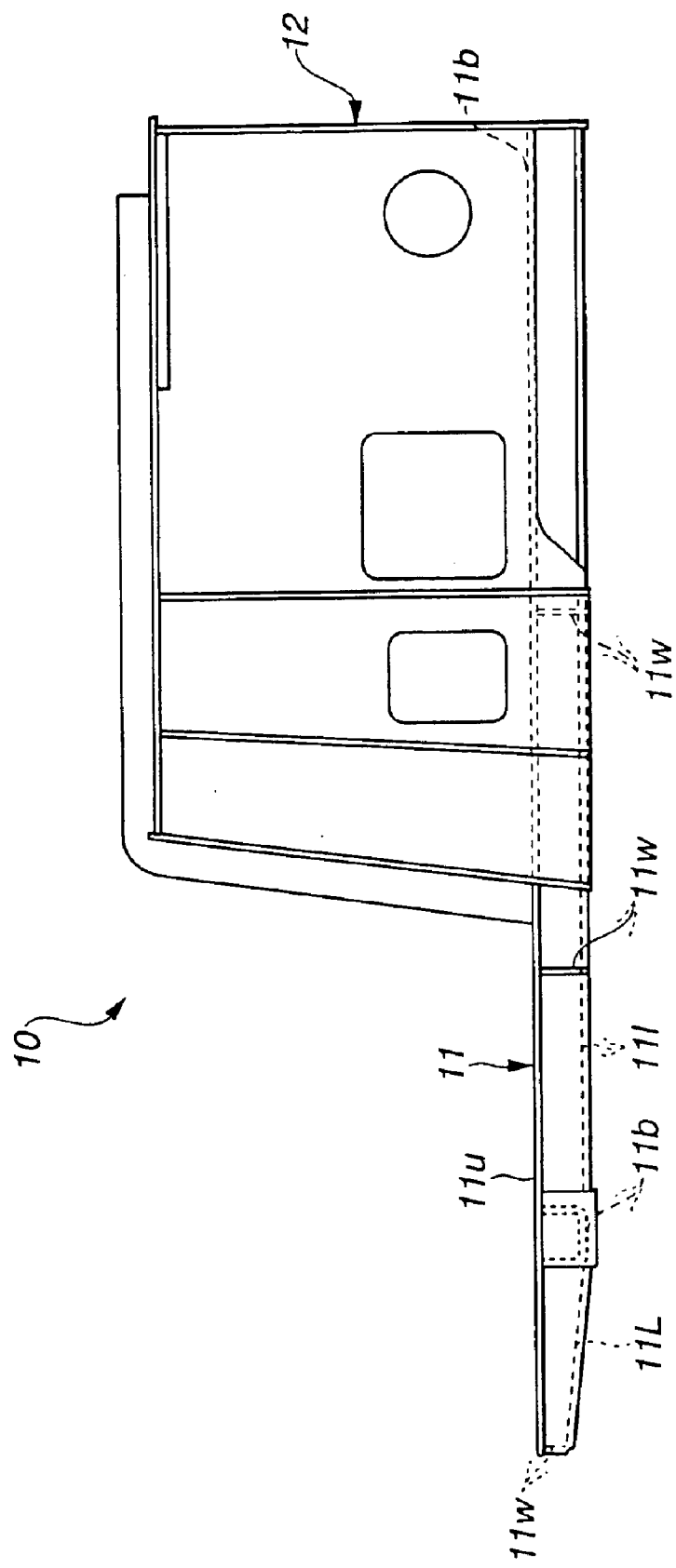
FIG. 6 is a side view showing the floor frame of the operator's cab in FIG. 1.
Figure 7:
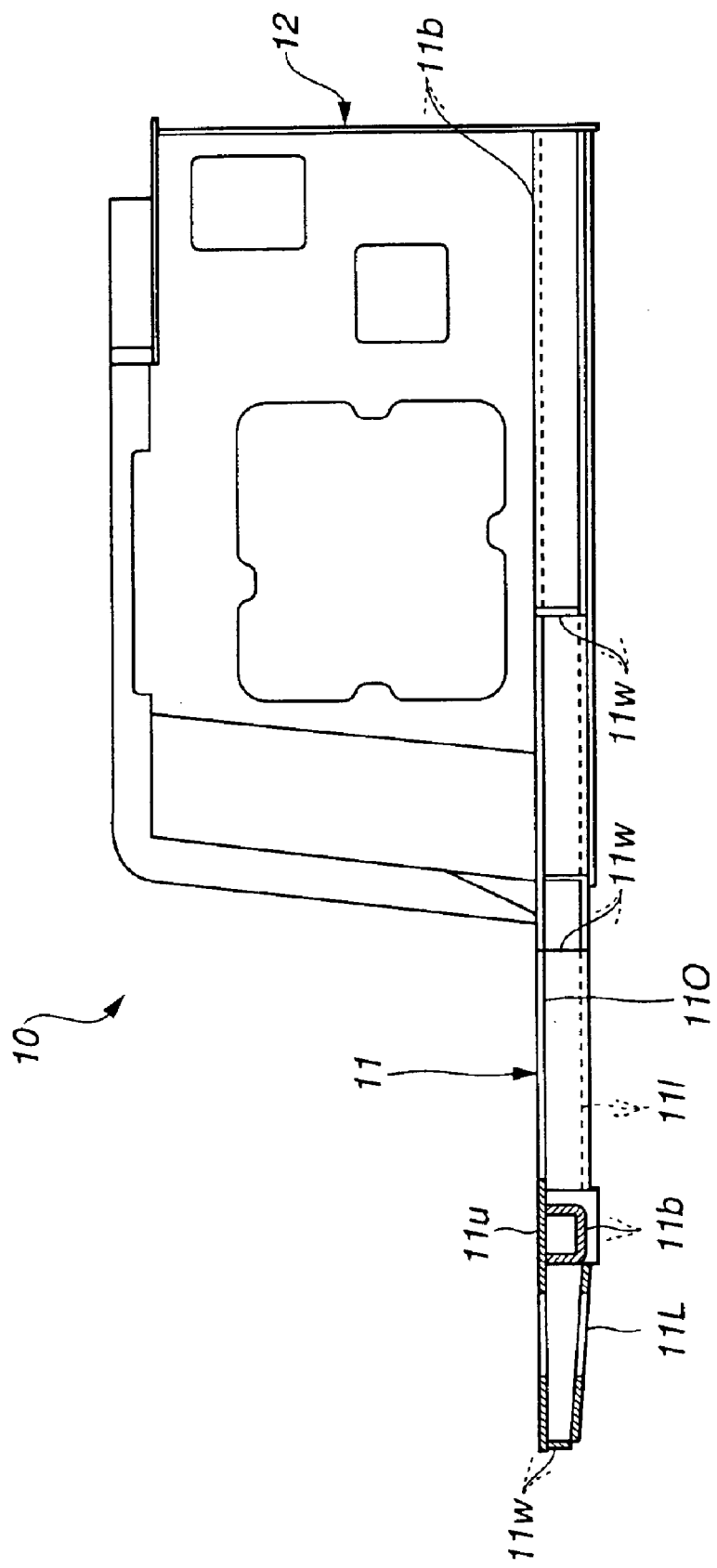
FIG. 7 is a cross-sectional view along line VII—VII in FIG. 5.
Figure 8:
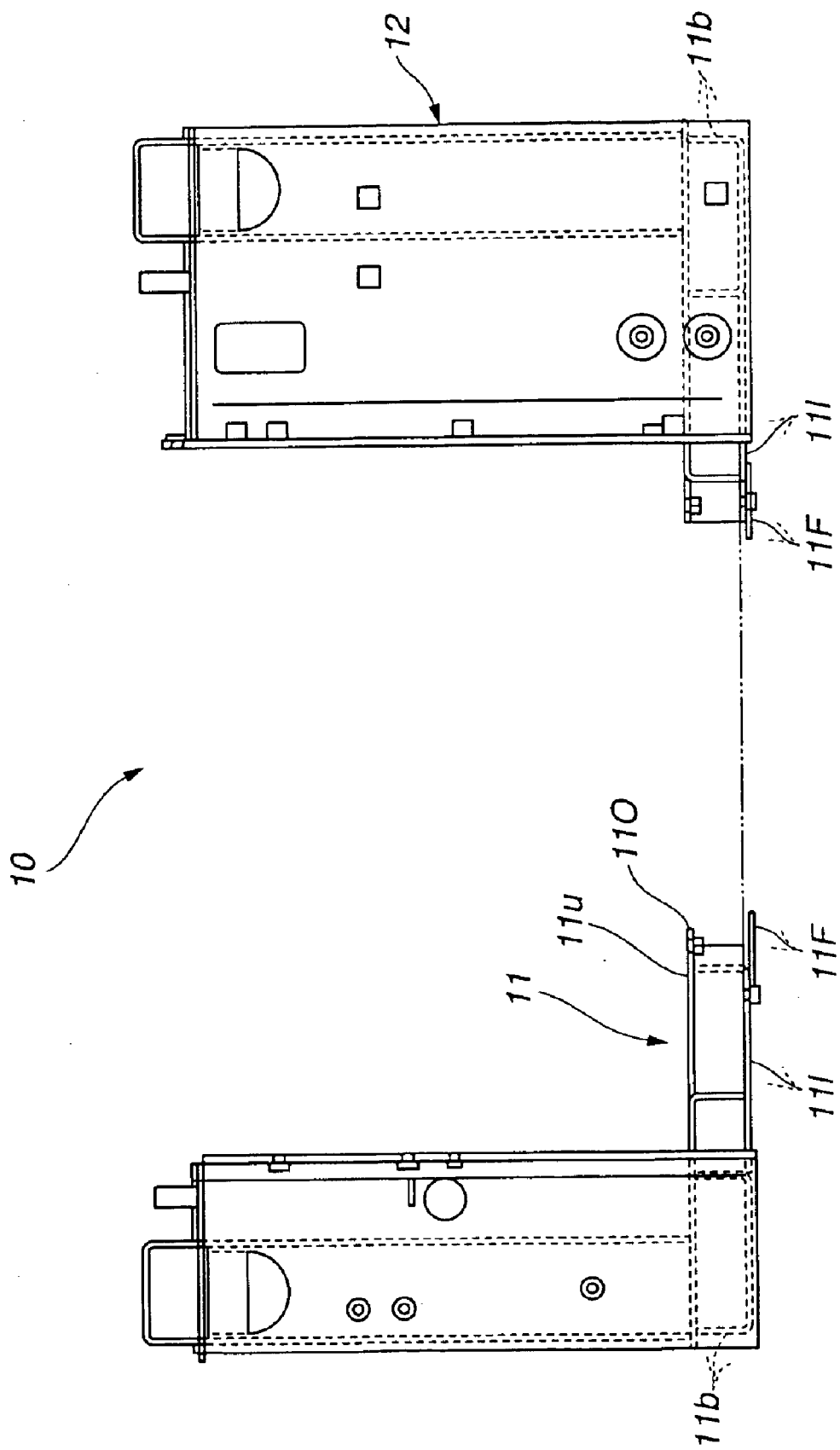
FIG. 8 is a cross-sectional view along line VIII—VIII in FIG. 5.

As shown in FIG. 3 and FIG. 4, the floor frame 10 comprises a flat floor base (floor section) 11, and a rear side frame 12 erected in a standing manner on the rear half portion of the floor base 11.

A maintenance hatch (opening) 110 used when servicing the power train 100 positioned below the cab (see FIG. 2) is formed passing through the center of the floor base 11, and this maintenance hatch 110 is generally closed by means of a first hatch cover (lid member) 20 and a second hatch cover (lid member) 30 installed on the floor base 11.

Here, as shown in FIG. 5 to FIG. 8, the floor base 11 of the floor frame 10 comprises an upper plate 11u in which the maintenance hatch 110 is formed, and a lower plate 11l which is provided opposing the upper plate 11u to the lower side thereof, and furthermore, it also comprises a plurality of beams 11b and webs 11w connecting the upper plate 11u and the lower plate 11l together.

By assembling the upper plate 11u, lower plate 11l, beams 11b and webs 11w in a box shape, the floor base 11 of the floor frame 10 is formed in the shape of a hollow box.

Moreover, installation holes 11o, 11o, . . . used for installing the first hatch cover 20 and the second hatch cover 30 are formed in upper plate 11u of the floor base 11, in the edge regions of the opening of the maintenance hatch 110.

Furthermore, flange plates 11F, 11F, . . . are installed in the lower plate 11l and the beams 11b of the floor base 11, in such a manner that they follow the edges of the maintenance hatch 110, and sealing members (sealing means) 40 are installed on the edge portions of these flange plates 11F.

Figure 21:
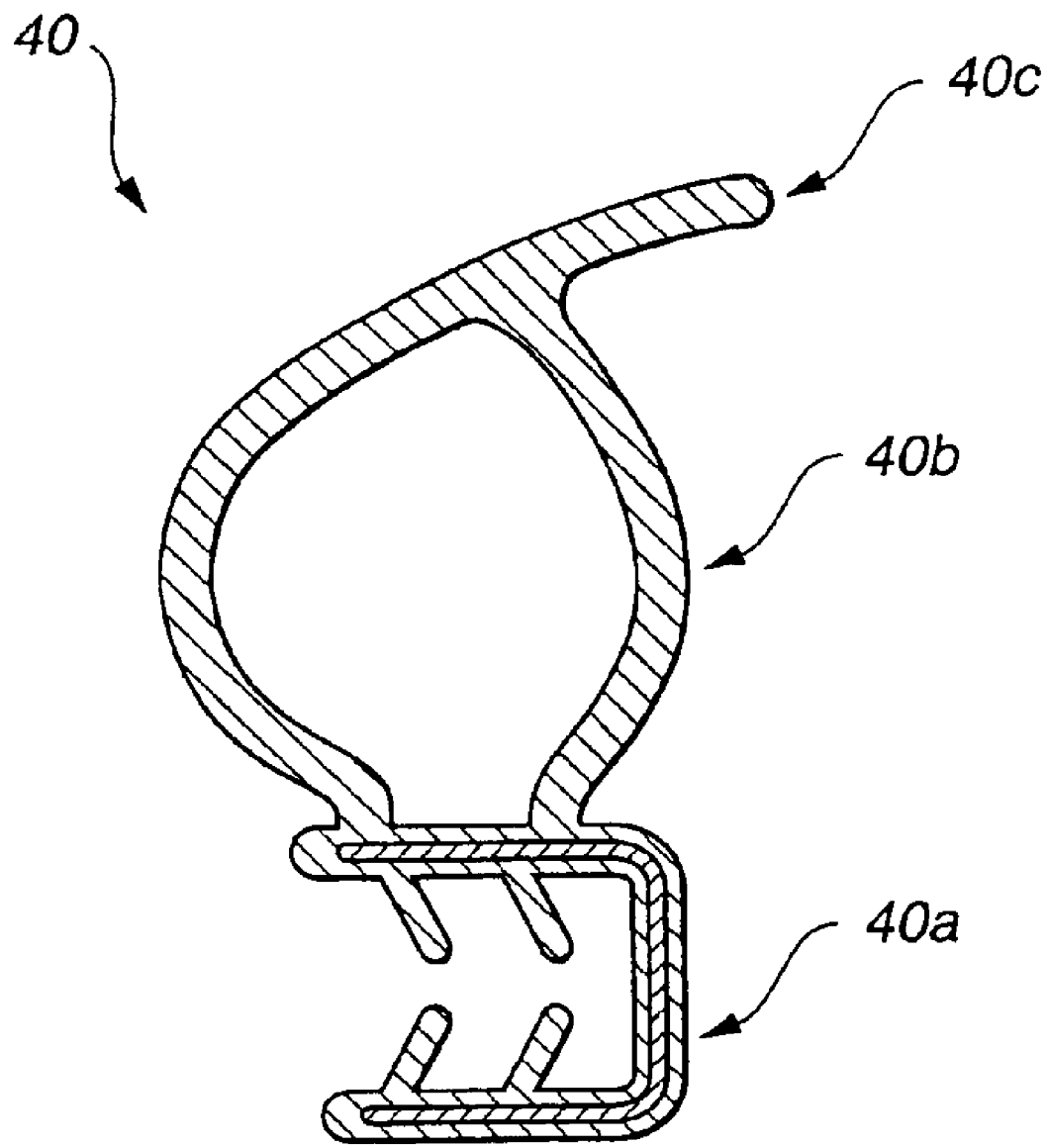
FIG. 21 is a horizontal cross-sectional view showing a sealing member.

Here, the sealing members 40 are means for forming a seal between the floor base 11 and the first hatch cover 20, and between the floor base 11 and the second hatch cover 30, and each sealing member comprises a fitting section 40a having a square U-shaped cross-section and being provided with tongue members as illustrated in FIG. 21, a deformed section 40b having a ring-shaped cross-section, and a lip section 40c which projects from this deformed section 40b.

Figure 9:
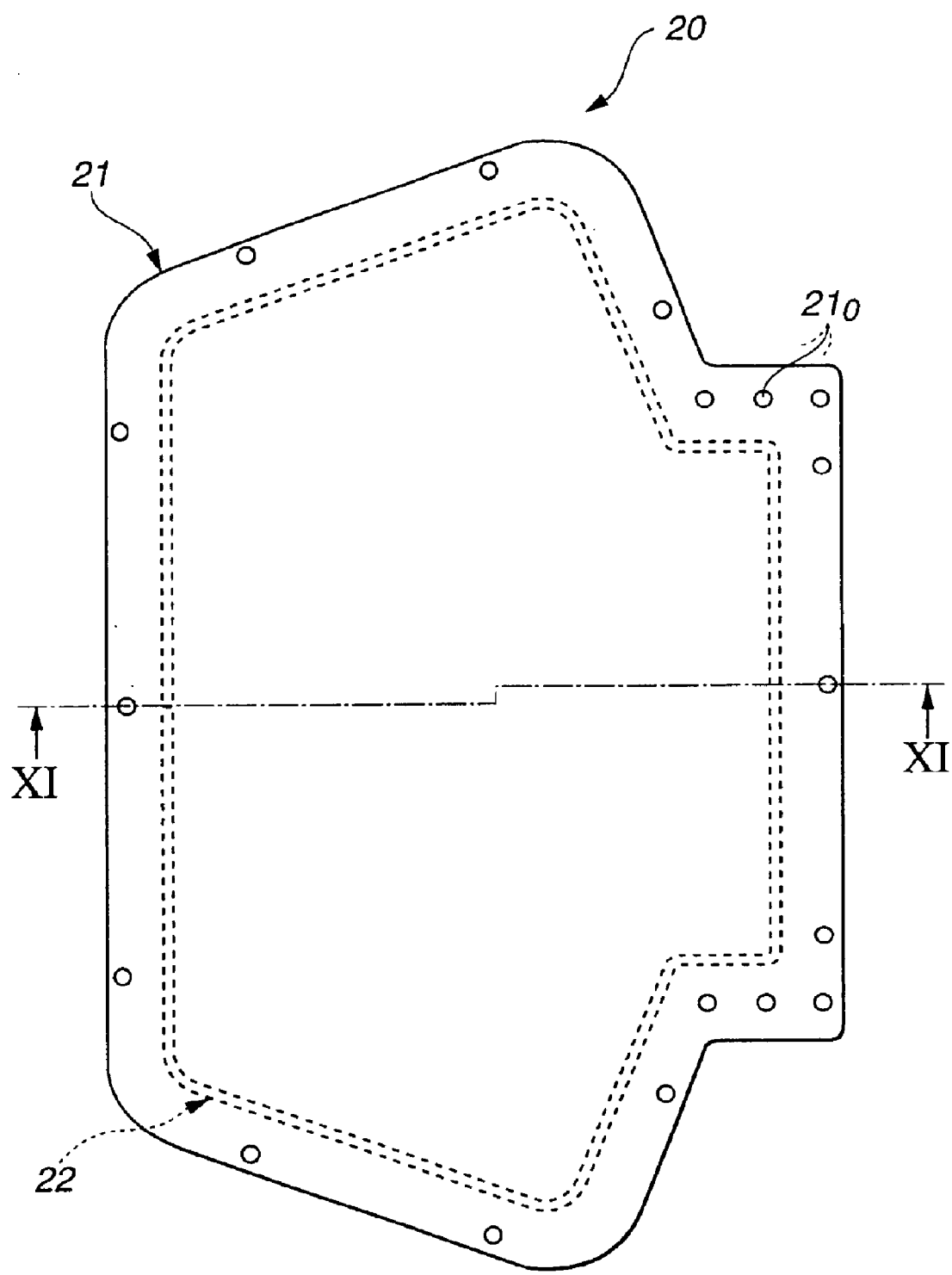
FIG. 9 is a plan view showing a first hatch cover.
Figure 10:
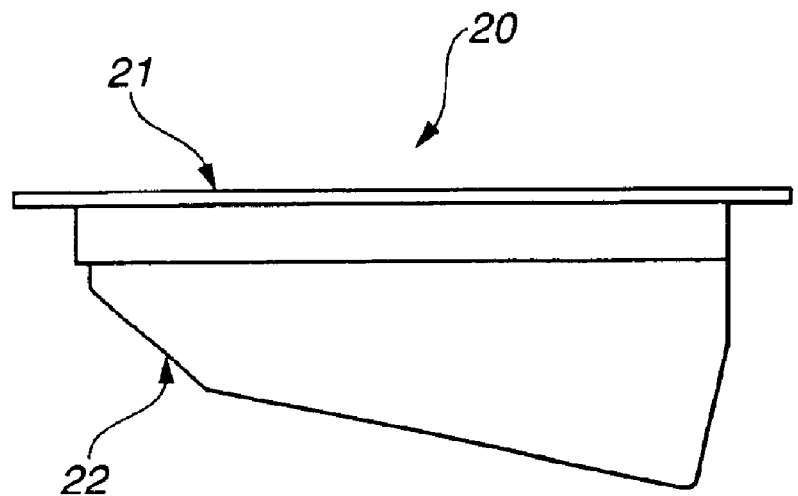
FIG. 10 is a side view showing the first hatch cover.
Figure 11:
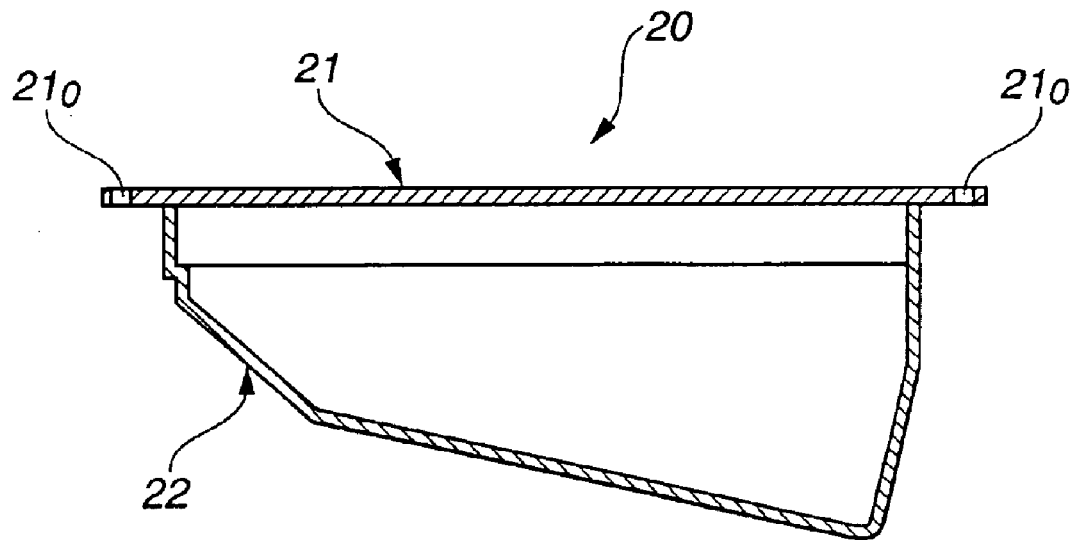
FIG. 11 is a cross-sectional view along line XI—XI in FIG. 9.

As shown in FIG. 9 to FIG. 11, the first hatch cover 20 comprises a panel 21 shaped so as to cover the front half portion of the maintenance hatch 110 (the left-hand half portion thereof in FIG. 5), and a shell 22 which fits into the front half portion of the maintenance hatch 110, this panel 21 and shell 22 being assembled into a unified body, by suitable means such as fastening bolts, welding, or the like, whereby the first hatch cover 20 assumes a hollow box-shaped structure.

Installation holes 21o, 21o, . . . are provided in the perimeter of the panel 21 of the first hatch cover 20, in respective positions corresponding to the installation holes 11o, 11o, . . . formed in the upper plate 11u of the floor base 11.

Figure 12:
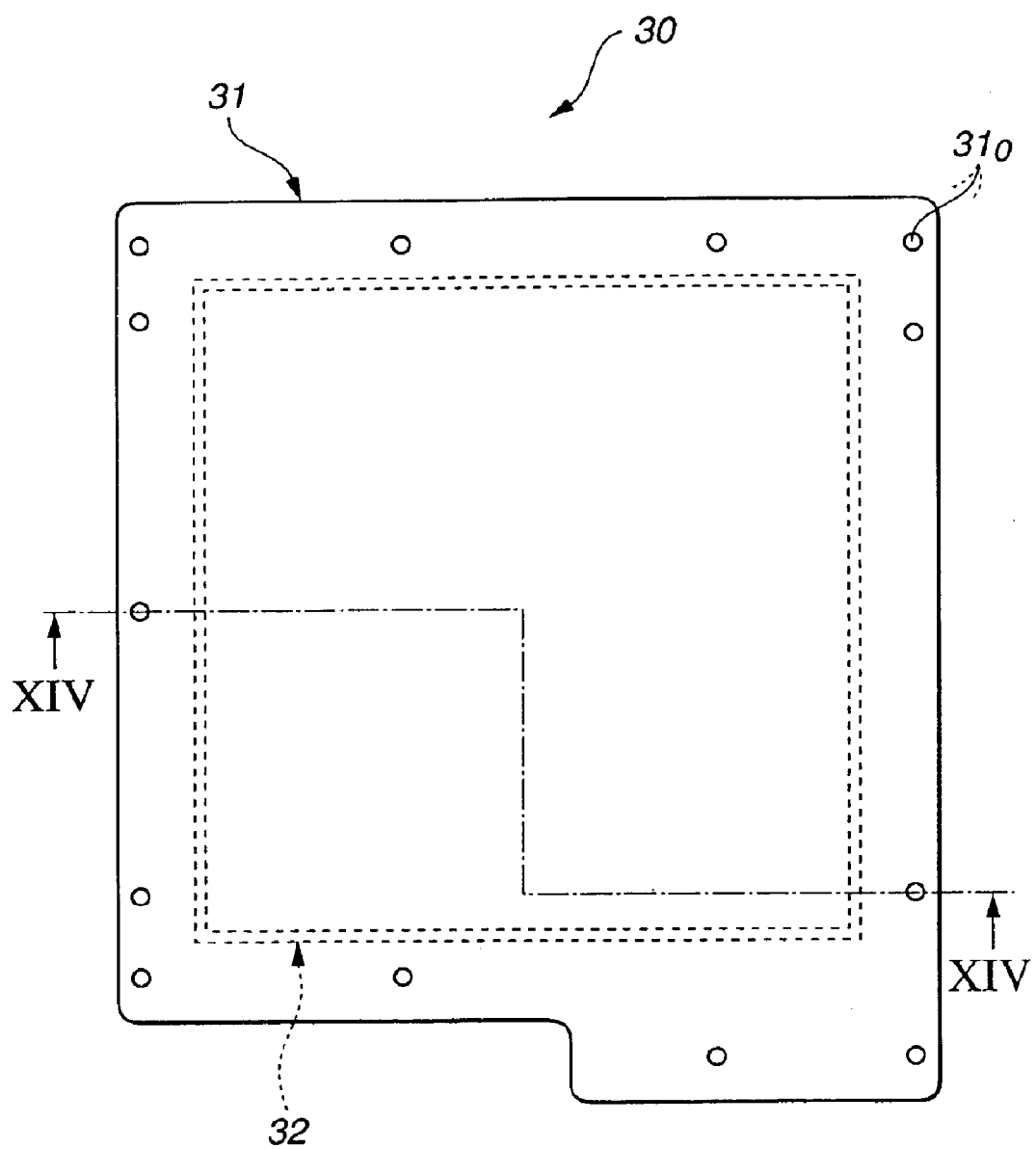
FIG. 12 is a plan view showing a second hatch cover.
Figure 13A:
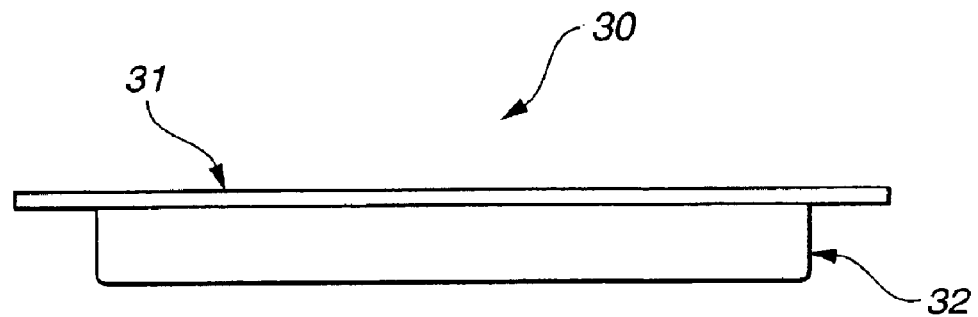
FIG. 13A and FIG. 13B are a side view and a front view showing the second hatch cover.
Figure 13B:
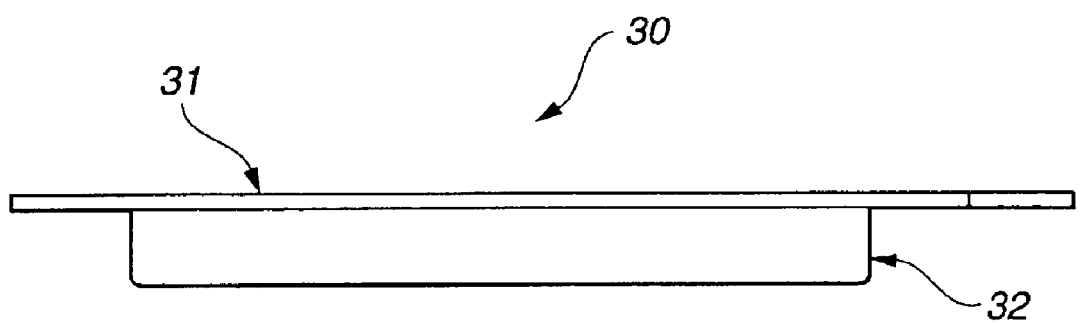
Figure 14:
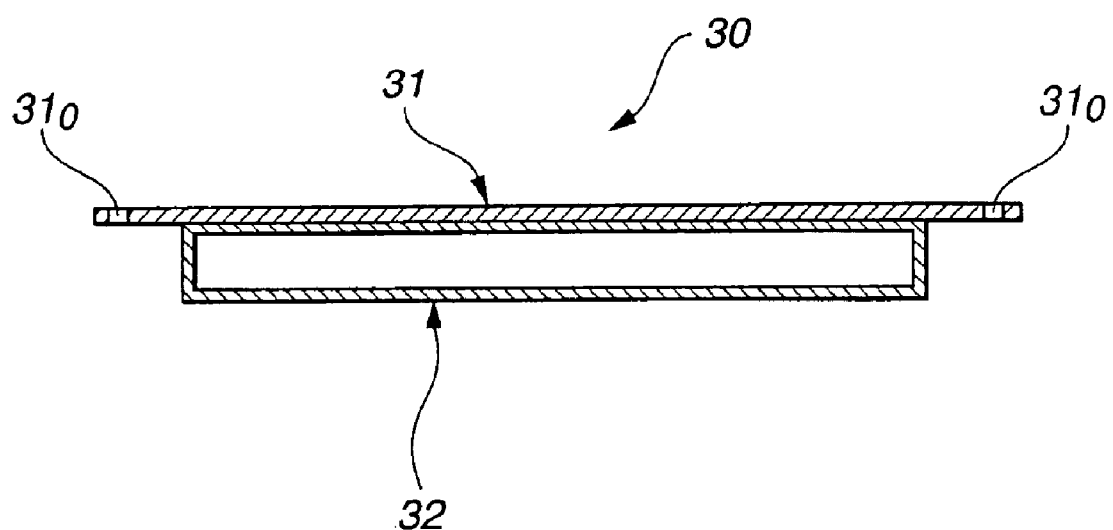
FIG. 14 is a cross-sectional view along line XIV—XIV in FIG. 12.

As shown in FIG. 12 to FIG. 14, the second hatch cover 30 comprises a square-shaped panel 31 having a partial projection, which covers the rear half portion of the maintenance hatch 110 (the right-hand half portion thereof in FIG. 5), and a shell 32 which fits into the rear half portion of the maintenance hatch 110, this panel 31 and shell 32 being assembled into a unified body, by suitable means such as fastening bolts, welding, or the like, whereby the second hatch cover 30 assumes a hollow box-shaped structure.

Installation holes 31o, 31o, . . . are provided in the perimeter of the panel 31 of the second hatch cover 30, in respective positions corresponding to the installation holes 11o, 11o, . . . formed in the upper plate 11u of the floor base 11.

As shown in FIG. 15 to FIG. 20, the first hatch cover 20 and the second hatch cover 30 are installed, using respective bolts, at prescribed positions of the floor base 11 of the floor frame 10, and when the maintenance hatch 110 in the floor base 11 is closed off by the first hatch cover 20 and the second hatch cover 30, then the seal members 40 installed on the floor base 11 make close contact with the first hatch cover 20 and the second hatch cover 30, as described previously.

Therefore, the gap between the floor base 11 of the floor frame 10 and the first hatch cover 20 and the second hatch cover 30 is sealed by the movement of the seal members 40.

Figure 15:
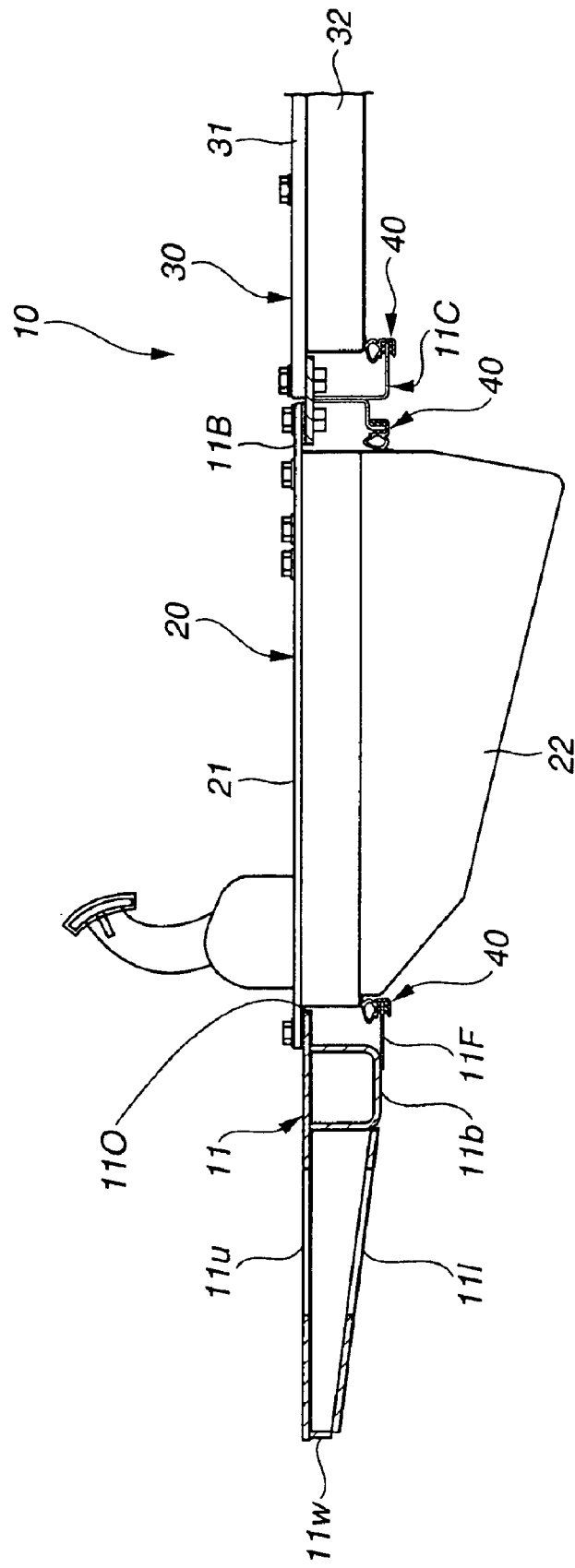
FIG. 15 is a principal cross-sectional side view showing a state where the lid member is installed on the floor frame.
Figure 16:
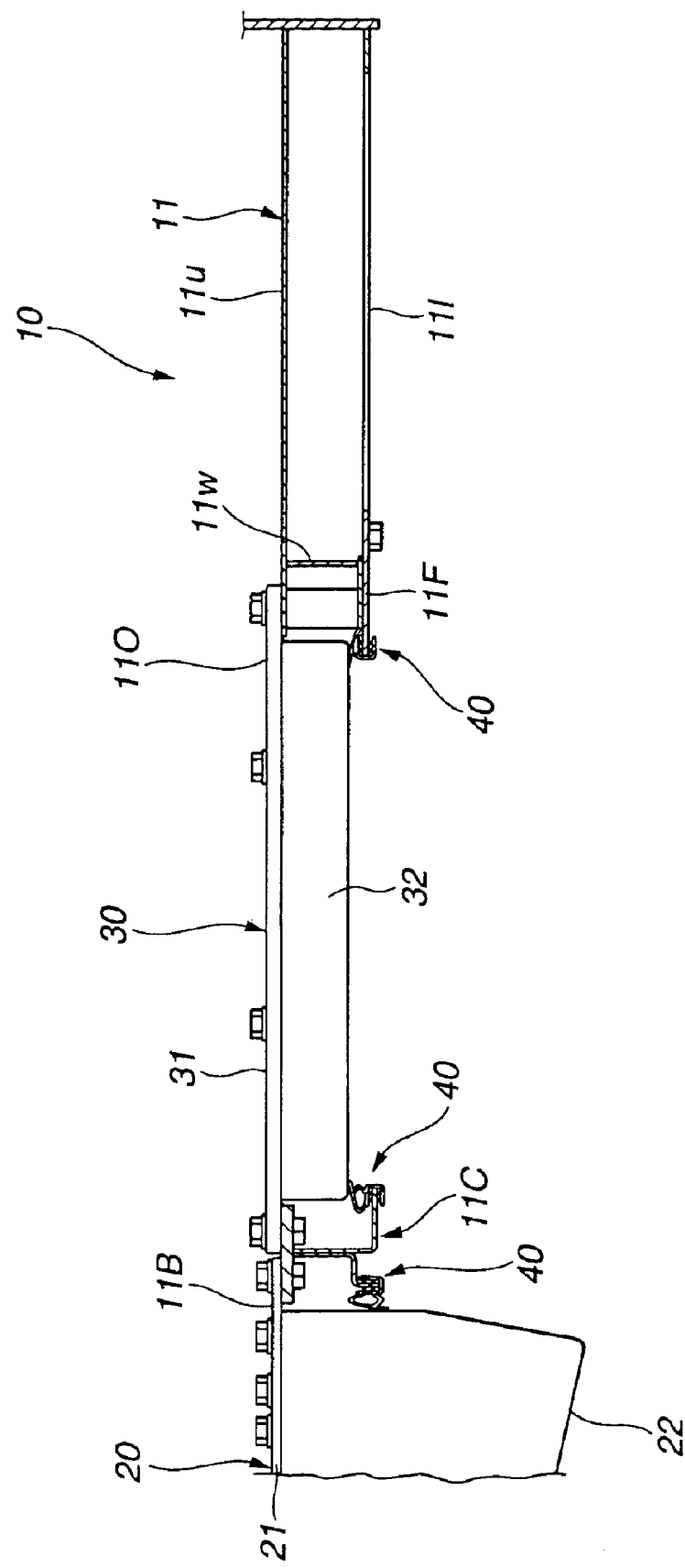
FIG. 16 is a principal cross-sectional side view showing a state where the lid member is installed on the floor frame.
Figure 17:
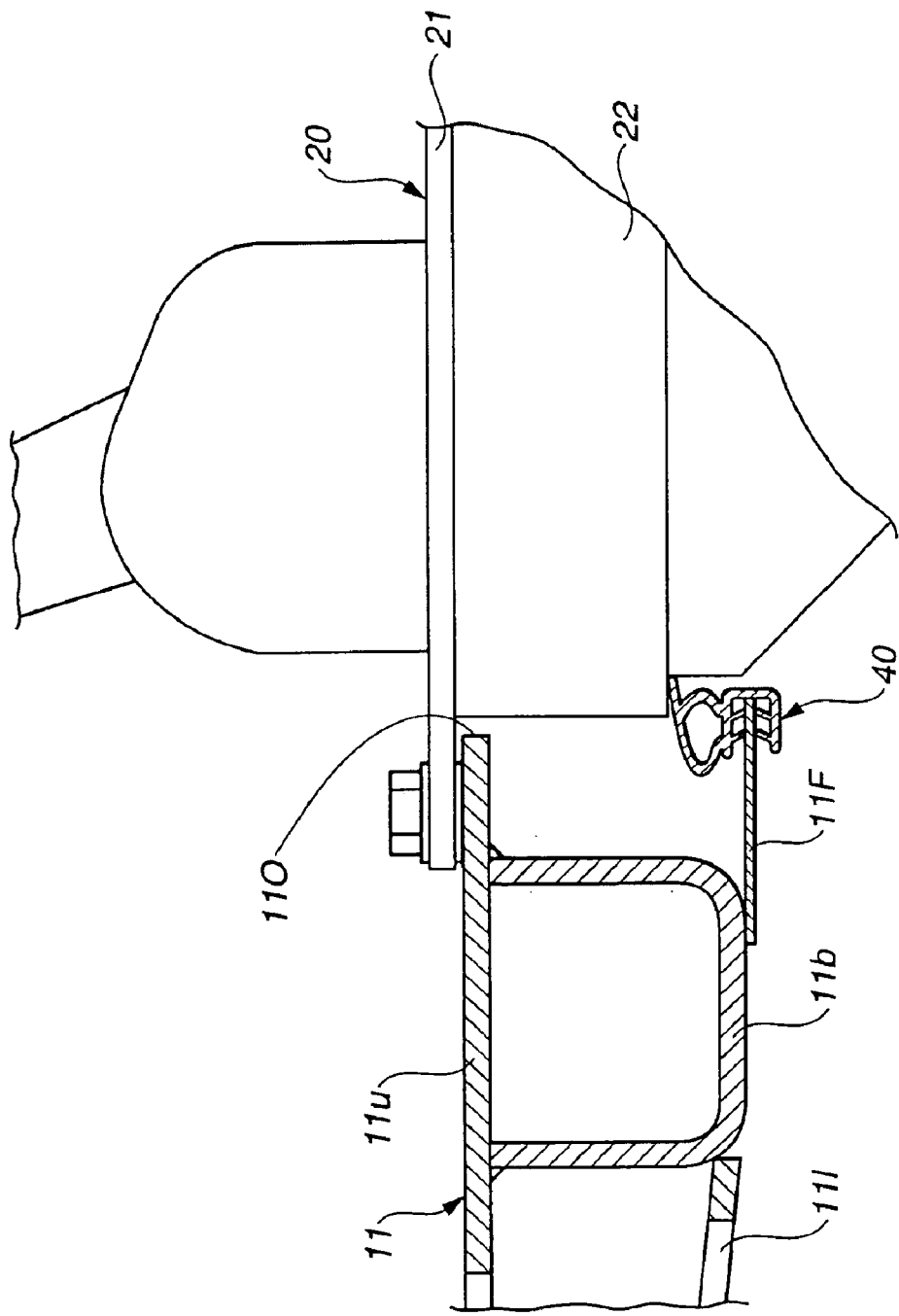
FIG. 17 is a principal enlarged cross-sectional view showing a state where the lid member is installed on the floor frame.
Figure 18:
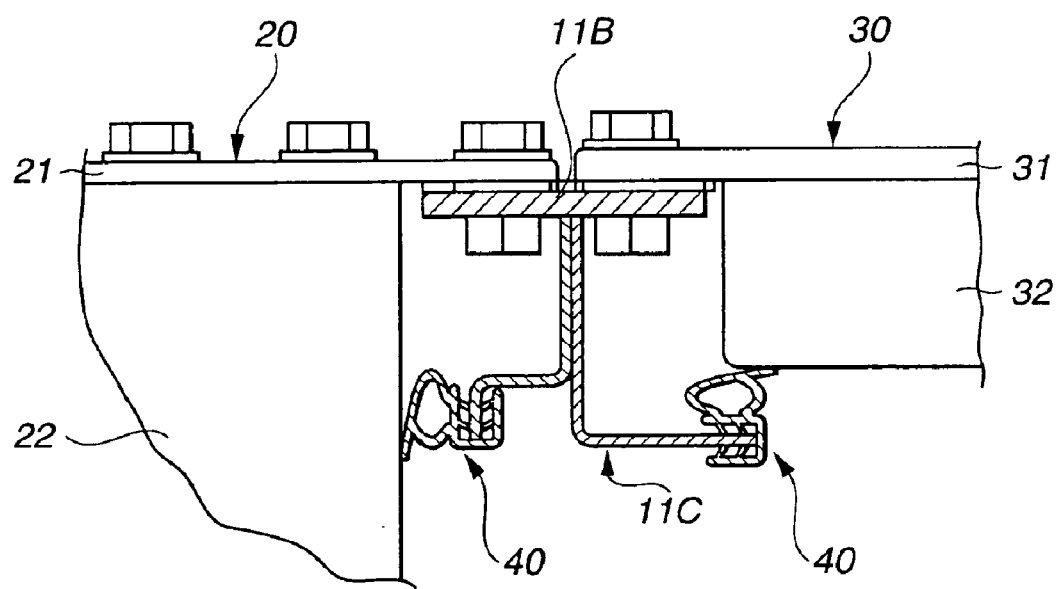
FIG. 18 is a principal enlarged cross-sectional view showing a state where the lid member is installed on the floor frame.
Figure 19:
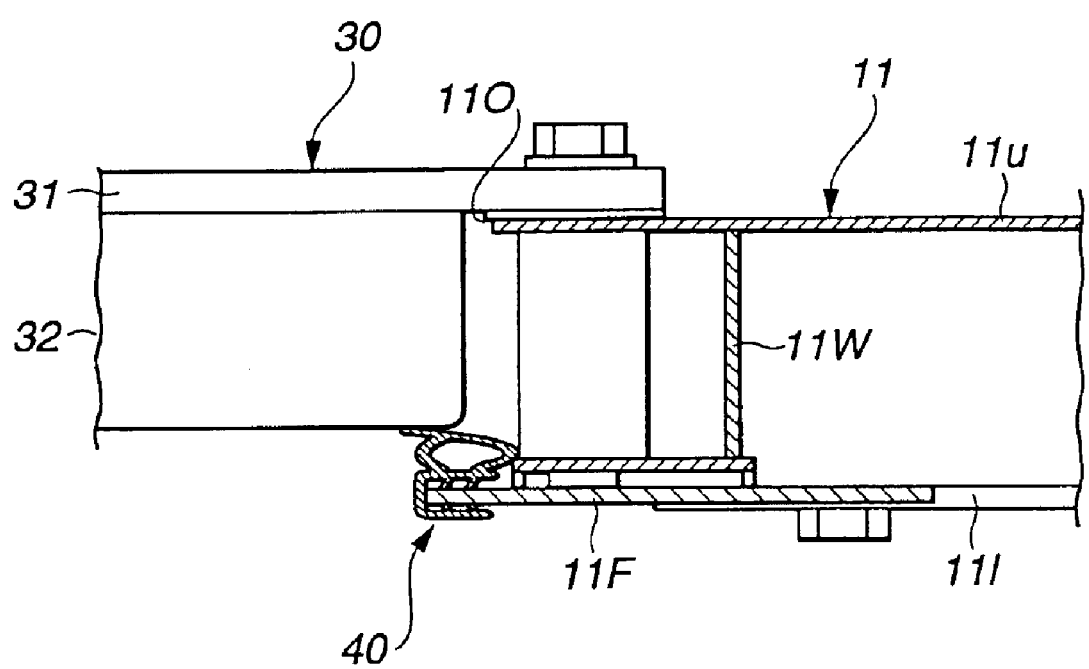
FIG. 19 is a principal enlarged cross-sectional view showing a state where the lid member is installed on the floor frame.
Figure 20:
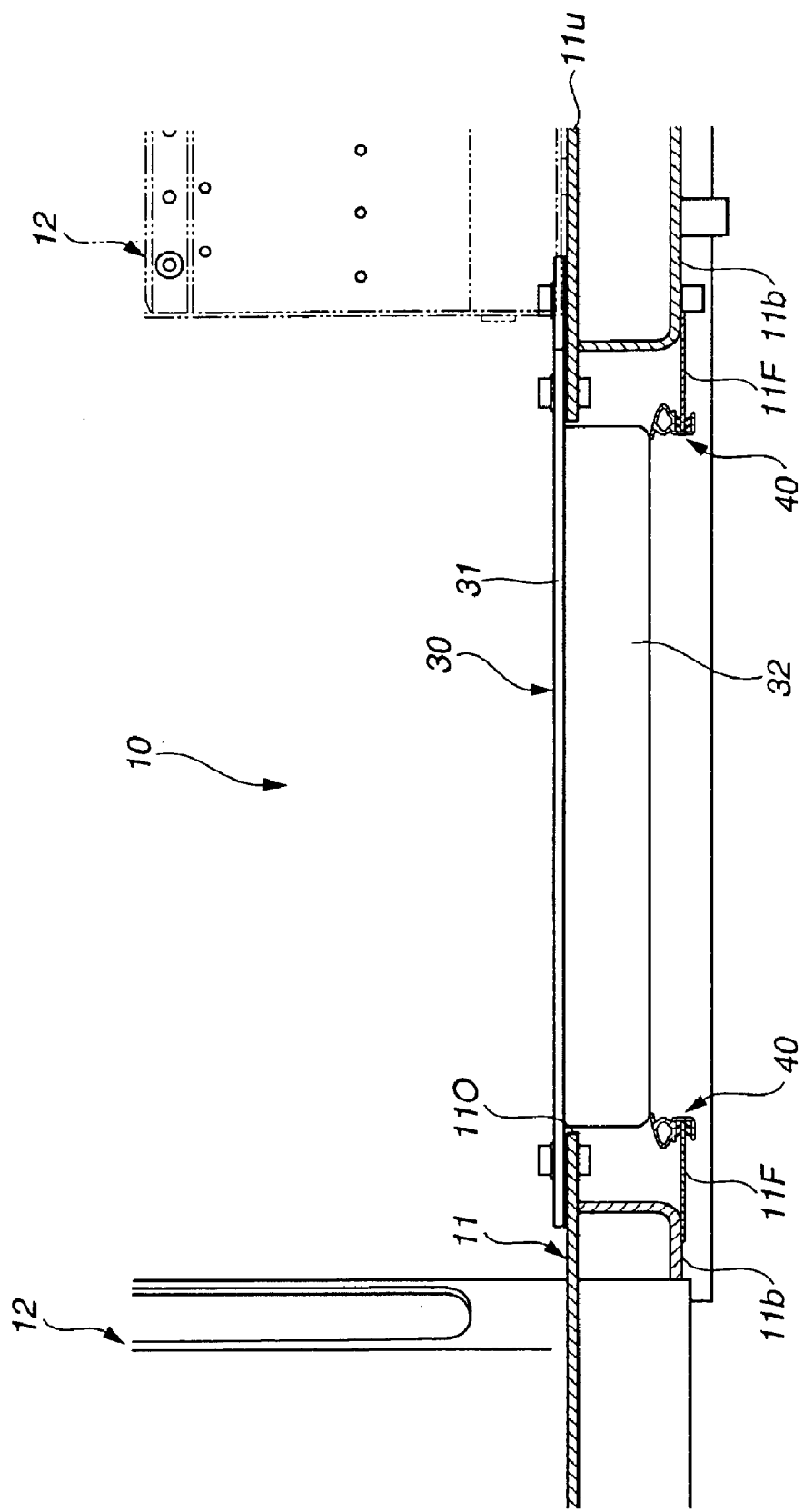
FIG. 20 is a principal cross-sectional front view showing a state where the lid member is installed on the floor frame.

Moreover, as shown in FIG. 15, FIG. 16 and FIG. 18, the mutually adjacent edge portions of the panel 21 of the first hatch cover 20 and the panel 31 of the second hatch cover 30 are both installed on a bracket 11B, by means of respective bolts, and hence the first hatch cover 20 and the second hatch cover 30 are mutually connected by means of this bracket 11B.

A flange frame 11C is provided on the bracket 11B, and a sealing member 40 which makes close contact with the first hatch cover 20 along the entire length thereof, and a sealing member 40 which makes close contact with the second hatch cover 30 along the entire length thereof, are installed on this flange frame 11C.

Therefore, the gap between the mutually adjacent mating portions of the first hatch cover 20 and the second hatch cover 30 is sealed by the function of the two seal members 40, 40.

In the operator's cab 3 having the composition described above, by forming both the floor base 11 of the floor frame 10, and the two hatch covers (the first hatch cover 20 and the second hatch cover 30) which fits into the maintenance hatch 110 of the floor base 11, such that they respectively have hollow box-shaped structures, and by sealing the gap between the floor base 11 and the first hatch cover 20 and the second hatch cover 30, by means of sealing members 40, it is possible to suppress the infiltration of noise from the power train 100 situated below the floor frame 10, into the operator's cab 3, as far as possible, and consequently, it is possible dramatically to improve the level of quietness in the operator's cab 3.

Moreover, according to the composition described above, by forming the first hatch cover 20 and the second hatch cover 30 respectively with hollow box-shaped structures, in addition to obtaining good noise insulation properties in both the first hatch cover 20 and the second hatch cover 30, the overall weight of these hatch covers also becomes remarkably light in comparison to that of a plate-shaped lid member having equivalent noise insulating properties, and therefore the operation of removing the first hatch cover 20 and the second hatch cover 30 from the floor base 11 of the floor frame 10, or the operation of installing same on the floor base 11 can be carried out very readily, thereby dramatically enhancing workability during servicing of the power train 100.

According to the operator's cab 3 of the bulldozer 1 having the composition described above, it is possible to achieve good quietness characteristics, in addition to which, it is also possible to achieve good workability during servicing.

In the embodiment described above, the maintenance hatch 110 of the floor base 11 of the floor frame 10 is closed off by means of two hatch covers, namely, the first hatch cover 20 and the second hatch cover 30, but it is of course also possible to adopt a composition in which the maintenance hatch is closed off by means of a single hatch cover, provided that the shape (size) and weight thereof presents no obstacle to the operability during removal or installation work.

Furthermore, the embodiment described above related to an example wherein the present invention is applied to the operator's cab of a bulldozer, which is one type of a construction vehicle, but the present invention may of course also be applied effectively to the operator's cab of various types of construction vehicles other than a bulldozer, such as a hydraulic shovel, or the like, for example.

Furthermore, the present invention may of course be applied effectively to various types of work machines, other than construction vehicles such as bulldozers, hydraulic shovels, or the like, which have an operator's cab situated over a power train, such as various types of agricultural vehicles, such as tractors, or the like, for example.

What is claimed is:

1. An operator's room of a work machine, situated in a region above a power train of the work machine, and comprising an opening for maintenance purposes formed passing through a floor section of a floor frame, a lid member for closing off the opening being installed on the floor section;

wherein the floor section of the floor frame has a hollow box-type structure, and the lid member has a hollow box-type structure fitting into the opening in the floor section, sealing means being provided for sealing a gap between the floor section and the lid member.

* * * * *